United States Patent
Luna et al.

(10) Patent No.: US 9,306,897 B2
(45) Date of Patent: Apr. 5, 2016

(54) SMART MEDIA DEVICE ECOSYSTEM USING LOCAL DATA AND REMOTE SOCIAL GRAPH DATA

(71) Applicants: Michael Edward Smith Luna, San Jose, CA (US); Thomas Alan Donaldson, London (GB); Hawk Pang, San Jose, CA (US)

(72) Inventors: Michael Edward Smith Luna, San Jose, CA (US); Thomas Alan Donaldson, London (GB); Hawk Pang, San Jose, CA (US)

(73) Assignee: AliphCom, San Francisco, CA (US)

( * ) Notice: Subject to any disclaimer, the term of this patent is extended or adjusted under 35 U.S.C. 154(b) by 0 days.

(21) Appl. No.: 13/906,244

(22) Filed: May 30, 2013

(65) Prior Publication Data
US 2014/0358951 A1    Dec. 4, 2014

(51) Int. Cl.
G06F 17/30    (2006.01)
H04L 12/58    (2006.01)
H04L 29/08    (2006.01)

(52) U.S. Cl.
CPC .......... *H04L 51/32* (2013.01); *G06F 17/30029* (2013.01); *H04L 67/22* (2013.01); *H04L 67/306* (2013.01)

(58) Field of Classification Search
USPC ......... 707/2, 3, 758; 340/686.6; 709/204–206
See application file for complete search history.

(56) References Cited

U.S. PATENT DOCUMENTS

| | | | |
|---|---|---|---|
| 2011/0113051 A1* | 5/2011 | Lindahl et al. | 707/758 |
| 2011/0309946 A1* | 12/2011 | Jonsson et al. | 340/686.6 |
| 2012/0011202 A1 | 1/2012 | Occhino et al. | |
| 2012/0166964 A1 | 6/2012 | Tseng | |
| 2013/0097238 A1 | 4/2013 | Rogers et al. | |

FOREIGN PATENT DOCUMENTS

WO    2014193483    12/2014

OTHER PUBLICATIONS

Young, Lee W., Notification of Transmittal of the International Search Report and the Written Opinion of the International Searching Authority, or the Declaration, Mailed Nov. 7, 2014 for International Patent Application No. PCT/US2014/000140, International Searching Authority.

* cited by examiner

*Primary Examiner* — Etienne Leroux
(74) *Attorney, Agent, or Firm* — Kokka & Backus, PC

(57) ABSTRACT

Techniques associated with a smart media ecosystem using local data and remote social graph data are described, including identifying an account associated with a user based on a detection of a presence of a compatible device, the compatible device being associated with the account in a profile, receiving an input indicating a request for media content, retrieving remote social graph data from a remote database, cross-referencing the remote social graph with profile data being stored locally, the profile data associated with media preferences, updating the profile data with a learned media preference generated by a learning module, selecting targeted media content based on the profile data, and sending a control signal to a media device, the control signal configured to cause the media device to output the targeted media content.

15 Claims, 7 Drawing Sheets

SMART MEDIA DEVICE ECOSYSTEM USING LOCAL DATA AND REMOTE SOCIAL GRAPH DATA

CROSS-REFERENCE TO RELATED APPLICATIONS

This application is related to co-pending U.S. patent application Ser. No. 13/894,850, filed May 15, 2013, and entitled "Smart Media Device Ecosystem Using Local and Remote Data Sources," which is incorporated by reference herein in its entirety for all purposes.

FIELD

The present invention relates generally to electrical and electronic hardware, computer software, wired and wireless network communications, and computing devices. More specifically, techniques related to smart media device ecosystem using local data and remote social graph data are described.

BACKGROUND

Conventional devices and techniques for providing media content are limited in a number of ways. Conventional media devices (i.e., media players, such as speakers, televisions, computers, e-readers, smartphones) typically are not well-suited for selecting targeted media content for a particular user. While some conventional media devices are capable of operating applications or websites that provide targeted media content services, such services typically provide media content only on a device capable of downloading or running that media service application or website. Such applications and websites typically are unable to select or control other media devices in a user's ecosystem of media devices for providing media content. Such applications and websites also typically are unable to provide targeted media content to a user's social network, including media devices owned by members of the user's social network.

Conventional media services and devices also typically do not automatically select media content in view of environmental or physiological factors associated with a user. Nor are they typically configured to identify and cross-reference local data with remote social graph data, for example, from one or more third party media services or social networking services. Conventional media devices also typically are not configured to target media content for a user based on media preferences specified by a user across multiple media services and social networking services.

Thus, what is needed is a solution for a smart media device ecosystem using local data and remote social graph data without the limitations of conventional techniques.

BRIEF DESCRIPTION OF THE DRAWINGS

Various embodiments or examples ("examples") are disclosed in the following detailed description and the accompanying drawings.

Figure 1:
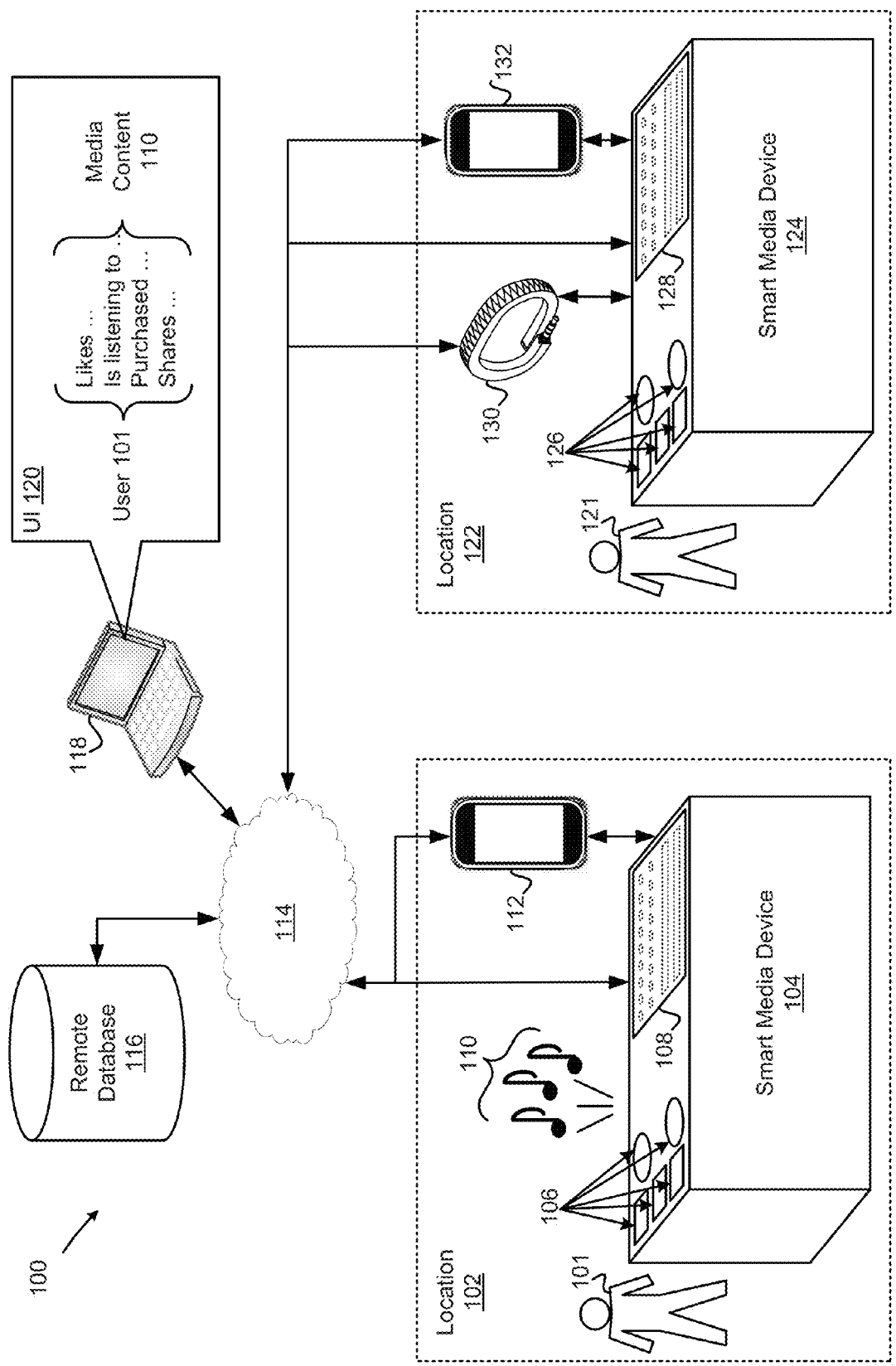
FIG. 1 illustrates an exemplary system of communication between separately located smart media devices.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

FIG. 1 illustrates an exemplary system of communication between separately located smart media devices. Here, system 100 includes users 101 and 121, locations 102 and 122, smart media devices 104 and 124, buttons 106 and 126, displays 108 and 128, mobile devices 112 and 132, network 114, remote database 116, computing device 118, user interface 120, and wearable device 130. In some examples, smart media device 104 may include a media player configured to play (i.e., output audio and/or video associated with) media content 110, which may include audio content, as shown. In other examples, smart media device 104 may include one or more different media players configured to play different types of media content (e.g., audio content, video content, graphic content, textual content, or the like). In some examples, smart media devices 104 and 124 may be configured to select targeted media content to be output by a media device implemented by smart media devices 104 and 124, or other media players (e.g., applications, devices, output mechanisms, and the like) implemented, for example, by mobile device 112 and 132, or wearable device 130. Examples of smart media devices 104 and 124 are described and disclosed in related, co-pending U.S. patent application Ser. No. 13/894,850 filed on May 15, 2013, which is incorporated by reference herein in its entirety for all purposes. In some examples, smart media device 104 may be configured to detect a presence and proximity of mobile device 112 or other compatible devices (e.g., devices capable of communicating using a common protocol, devices having common services, devices having common operational capabilities, devices configured to perform same or similar functions, or the like), and to identify mobile device 112 as being associated with user 101, for example, by referencing a profile associated with an account belonging to user 101. In some examples, smart media device 104 may be configured to generate and send a control signal to mobile device 112 to cause mobile device 112 to play targeted media content (e.g., media content 110, or the like).

In some examples, user 101 may indicate a request to smart media device 104 for targeted media content (i.e., media content selected for user 101 according to user 101's media preferences as generated, accessed and/or stored by smart media device 104 according to local and remote data). In some examples, such a request may be made by pressing one or more of buttons 106. For example, pressing one of buttons 106 may be preprogrammed to indicate a request for targeted media content. In other examples, a sequence of button selections may be preprogrammed to indicate a request for targeted media content. In still other examples, such a request may be made using a user interface or application implemented by mobile device 112. For example, mobile device 112 may operate an application configured to provide a user interface using which user 101 may indicate a request for targeted media content, causing mobile device 112 to send a signal to smart media device (i.e., using a short range communication protocol configured for short range exchange of data (e.g., Bluetooth®, ultra wideband, NFC, or the like)) to select targeted media content for user 101. In some examples, smart media device 104 may, in response to said request, retrieve remote data from remote database 116 and cross-reference said remote data with local data, for example, data stored in, or captured by, smart media device 104 and mobile device 112. Such local data may include profile data associated with an account, and profile data may include media preference data generated from historical usage data (e.g., previously played or viewed media, prior environmental data associated with said prior consumption of media, previously input media preference data, previously downloaded remote data, and the like) and historical environmental data, for example, as may be analyzed by a learning module. In some examples, profile data also may include user identification data, device identification data (i.e., data identifying devices associated with a user), and metadata. In some examples, profile also may include data indicating devices owned or used by, or otherwise accessible to, members of a user's social network. In some examples, local data also may include data from devices in short range communication (e.g., using Bluetooth®, ultra wideband, NFC, or the like) with smart media device 104, for example, mobile device 112. In other examples, smart media device 124 may be configured to operate similarly to smart media device 104, for example, with respect to user 121 and associated devices (e.g., wearable device 130 and mobile device 132, and the like) in location 122.

In some examples, user 101 also may indicate a request to smart media device 104 to share targeted media content with a remote device. In some examples, such a request may be made by pressing one or more of buttons 106. For example, pressing one of buttons 106 may be preprogrammed to indicate a request to share targeted media content, or other content being provided, displayed, or played by mobile device 112 or smart media device 104, with a remote device. In other examples, a sequence of button selections may be preprogrammed to indicate a request to share targeted media content. In still other examples, such a request may be made using a user interface or application implemented by mobile device 112. For example, mobile device 112 may operate an application configured to provide a user interface using which user 101 may indicate a request to share targeted media content, causing mobile device 112 to send a signal to smart media device (i.e., using a short range communication protocol configured for short range exchange of data (e.g., Bluetooth®, ultra wideband, NFC, or the like)) to send data associated with said targeted media content to remote database 116, computing device 118, wearable device 130, mobile device 132, smart media device 124, or other remote device, for example, using network 114. For example, remote database 116 may be configured to store social network data associated with a social networking service (e.g., Facebook®, Twitter®, LinkedIn®, Yelp®, Google+®, Instagram®, and the like), or media data associated with a media service (e.g., Pandora®, Spotify®, Rdio®, Last.fm®, Hulu®, Netflix®, and the like), of which user 101 is a member, or other social graph data associated with user 101. In this example, smart media device 104 may be configured to send targeted media content data to remote database 116 for storage and publication of said targeted media content data. In another example, such targeted media content data may be sent to computing device 118, which may be implemented as a laptop, a computer, a server, or other computing device. In some examples, computing device 118 may be configured to provide user interface 120 (e.g., using a display, touchscreen, input devices (e.g., keyboard, keypad, touchpad, mouse, or the like), one or more buttons, and the like), wherein information associated with said targeted media content data may be shared or presented (e.g., on a social networking website, media services website, or the like). In some examples, computing device 118 may process said targeted media content data, and publish information using user interface 120. For example, user 101 may indicate, using one or more of buttons 106 or an application implemented by mobile device 112, a request to share media content 110 with a social network or media service to which user 101 is a member. In this example, computing device 118 may process targeted media content data associated with media content 110 from smart media device 104, and publish information on user interface 120 regarding user 101's consumption of media content 110 (e.g., user 101 likes media content 110, user 101 is listening to media content 110, user 101 purchased media content 110, user 101 shares media content 110, or the like). In some examples, said application implemented by mobile device 112 may provide options to user 101 regarding sharing with a particular remote device.

For example, user 101 may indicate using said application a request that media content 110 be shared directly with smart media device 124 for consumption by user 121 in location 122. In this example, display 128 may light up or display a message indicating incoming data being shared by user 101, or by smart media device 104 belonging to user 101. In another example, user 101 may indicate using said application a request that media content 110, or a notification (e.g., message, light or other visual notification, vibratory notification, audio notification, or the like) associated with media content 110, be shared with mobile device 132 using a text message, email, push notification, vibration, or the like. In still another example, user 101 may indicate using said application a request that media content 110, or a notification associated with media content 110, be shared with wearable device 130. In other examples, targeted media content for user 121 in location 122 may be shared by smart media device 124 with user 101 in location 102 using smart media device 104, or published using a social networking website, media services website, or other third party website, using computing device 118 and user interface 120. In still other examples, the quantity, type, function, structure, and configuration of the elements shown may be varied and are not limited to the examples provided.

In some examples, wearable device 130 may be configured to be worn or carried. In some examples, wearable device 130 may be implemented as a data-capable strapband, as described in co-pending U.S. patent application Ser. No. 13/158,372, co-pending U.S. patent application Ser. No. 13/180,320, co-pending U.S. patent application Ser. No. 13/492,857, and co-pending U.S. patent application Ser. No. 13/181,495, all of which are herein incorporated by reference in their entirety for all purposes. In some examples, wearable device 130 may include one or more sensors (i.e., a sensor array) configured to collect local sensor data. Said sensor array may include, without limitation, an accelerometer, an altimeter/barometer, a light/infrared ("IR") sensor, a pulse/heart rate ("HR") monitor, an audio sensor (e.g., microphone, transducer, or others), a pedometer, a velocimeter, a global positioning system (GPS) receiver, a location-based service sensor (e.g., sensor for determining location within a cellular or micro-cellular network, which may or may not use GPS or other satellite constellations for fixing a position), a motion detection sensor, an environmental sensor, a chemical sensor, an electrical sensor, or mechanical sensor, and the like, installed, integrated, or otherwise implemented on wearable device 104. In other examples, wearable device 104 also may capture data from distributed sources (e.g., by communicating with mobile computing devices, mobile communications devices, computers, laptops, distributed sensors, GPS satellites, or the like) for processing with sensor data. In still other examples, the quantity, type, function, structure, and configuration of the elements shown may be varied and are not limited to the examples provided.

In some examples, displays 108 and 128 may be implemented as a light panel using a variety of available display technologies, including lights, light-emitting diodes (LEDs), interferometric modulator display (IMOD), electrophoretic ink (E Ink), organic light-emitting diode (OLED), or the like, without limitation. In other examples, displays 108 and 128 may be implemented as a touchscreen, another type of interactive screen, a video display, or the like. In some examples, smart media devices 104 and 124 may include software, hardware, firmware, or other circuitry (not shown), configured to implement a program (i.e., application) configured to cause control signals to be sent to displays 108 and 128, for example, to cause displays 108 and 128 to present a light pattern, a graphic or symbol (e.g., associated with battery life, communication capabilities, or the like), a message or other text (e.g., a notification, information regarding audio being played, information regarding characteristics of smart media device 104 and 124, or the like), a video, or the like.

In some examples, buttons 106 and 126 may be configured to execute control functions associated with smart media devices 104 and 124, respectively, including, without limitation, to turn smart media devices 104 and 124 on or off, adjust a volume, set an alarm, request information associated with smart media devices 104 and 124 (e.g., regarding battery life, communication protocol capabilities, or the like), provide a response to a prompt from smart media devices 104 and 124, or the like.

In some examples, mobile devices 112 and 132 may be implemented as a smartphone, a tablet, or other mobile communication or mobile computing device. In some examples, mobile devices 112 and 132 may include, without limitation, a touchscreen, a display, one or more buttons, or other user interface capabilities. In some examples, mobile devices 112 and 132 also may be implemented with various audio and visual/video output capabilities (e.g., speakers, video display, graphic display, and the like). In some examples, mobile devices 112 and 132 may be configured to operate various types of applications associated with media, social networking, phone calls, video conferencing, calendars, games, data communications, and the like. For example, mobile devices 112 and 132 may be implemented as a media device configured to store, access and play media content.

In some examples, wearable device 130 and/or mobile devices 112 and 132 may be configured to provide sensor data, including environmental and physiological data, to smart media devices 104 and 124. In some examples, wearable device 130 and/or mobile devices 112 and 132 also may be configured to provide derived data generated by processing the sensor data using one or more algorithms to determine, for example, advanced environmental data (e.g., whether a location is favored or frequented, whether a location is indoor or outdoor, home or office, public or private, whether other people are present, whether other compatible devices are present, weather, location-related services (e.g., stores, landmarks, restaurants, and the like), air quality, news, and the like) from said environmental data, and activity, mood, behavior, medical condition and the like from physiological data. In some examples, smart media devices 104 and 124 may be configured to cross-correlate (i.e., cross-reference) said sensor data and said derived data with other local data, as well as remote data (e.g., social, demographic, geographic, or other third-party proprietary or public media data from remote sources) to select targeted media content for smart media devices 104 and 124, or other media player, to play or display. In some examples, smart media devices 104 and 124 may select media content from a local source, a remote source, or both. In other examples, the quantity, type, function, structure, and configuration of the elements shown may be varied and are not limited to the examples provided.

Figure 2:
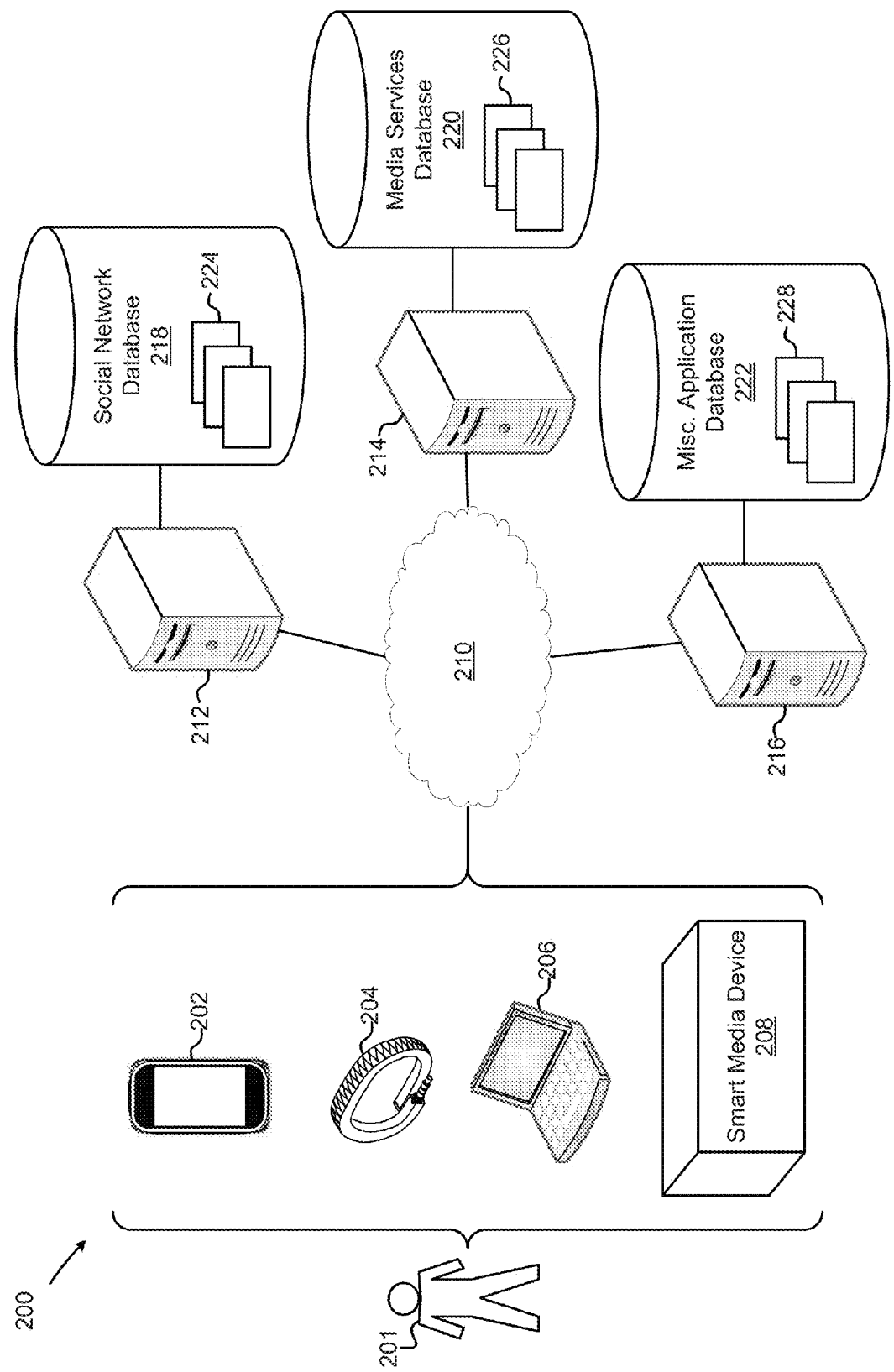
FIG. 2 illustrates an exemplary smart media device ecosystem associated with a user and capable of accessing remote databases.

FIG. 2 illustrates an exemplary smart media device ecosystem associated with a user and capable of accessing remote databases. Here, system 200 includes user 201, mobile device 202, wearable device 204, computing device 206, smart media device 208, network 210, servers 212-216, social network database 218, media services database 220, and miscellaneous application database 222. Like-numbered and named elements may describe the same or substantially similar elements as those shown in other descriptions. In some examples, mobile device 202, wearable device 204, computing device 206 and smart media device 208 may be identified, for example using an account profile stored in smart media device 208, or in a different profile stored on one or more other devices, as being associated with user 201. For example, each of mobile device 202, wearable device 204, computing device 206 and smart media device 208, may be registered to (i.e., identified, for example, using a media access control ("MAC") address, internet protocol ("IP") address, or other device identification, as belonging to, or primarily used by) user 201 with one or more third party entities (e.g., manufacturers, service providers or other third parties). In other examples, one or more of mobile device 202, wearable device 204, computing device 206 and smart media device 208 may be identified, for example, in an account profile, as being associated with another user (e.g., a user associated with user 201 through a social networking service account, a user associated with user 201 through a media service account, a user associated with user 201 through a different social graph, or the like).

In some examples, mobile device 202, wearable device 204, computing device 206 and smart media device 208, each may be configured to exchange data (e.g., request data from, receive responses from, receive pushed data, and the like) with servers 212-216, and thereby obtain (i.e., retrieve) and receive social network data 224 from social network database 218, media services data 226 from media services database 220, remote application data 228 from miscellaneous application database 222, as well as other remote data from remote devices. In some examples, social network database 218 may be owned, used and/or operated by a social networking service (e.g., Facebook®, Twitter®, LinkedIn®, Yelp®, Google-HO, Instagram®, and the like). In some examples, social network data 224 may include data associated with a social network account associated with (e.g., registered to, used by, identified with, or the like) user 201 (e.g., media information shared by user 302 and media information shared by user's social network 304 in FIG. 3, or the like). In some examples, media services database 220 may be owned, used and/or operated by a media service (e.g., Pandora®, Spotify®, Rdio®, Last.fm®, Hulu®, Netflix®, and the like). In some examples, media services data 226 may include data associated with a media service account associated with user 201 (e.g., media information about user 306 and media information about social graphs related to user 308 in FIG. 3, or the like). In some examples, miscellaneous application database 222 may be owned, used and/or operated by a third party entity responsible for creating, operating, providing, or otherwise managing data associated with, an application installed, or being used, by one or more of mobile device 202, wearable device 204, computing device 206 and smart media device 208. In some examples, application data 228 may include data associated with said application (e.g., a calendar application, e-mail application, gaming application, financial services application, news application, publishing application, media playing application, travel-related application, web browser application, other mobile or web applications, or the like). In some examples, mobile device 202, wearable device 204, computing device 206 and smart media device 208 may be configured to retrieve and receive remote data from remote devices using network 210 and long range communication protocols (e.g., satellite, mobile broadband, global positioning system (GPS), IEEE 802.11a/b/g/n (WiFi), and the like). In some examples, mobile device 202, wearable device 204, computing device 206 and smart media device 208, each also may be configured to exchange data with each other, using either or both long range communication protocols and short range communication protocols. In other examples, the quantity, type, function, structure, and configuration of the elements shown may be varied and are not limited to the examples provided.

Figure 3:
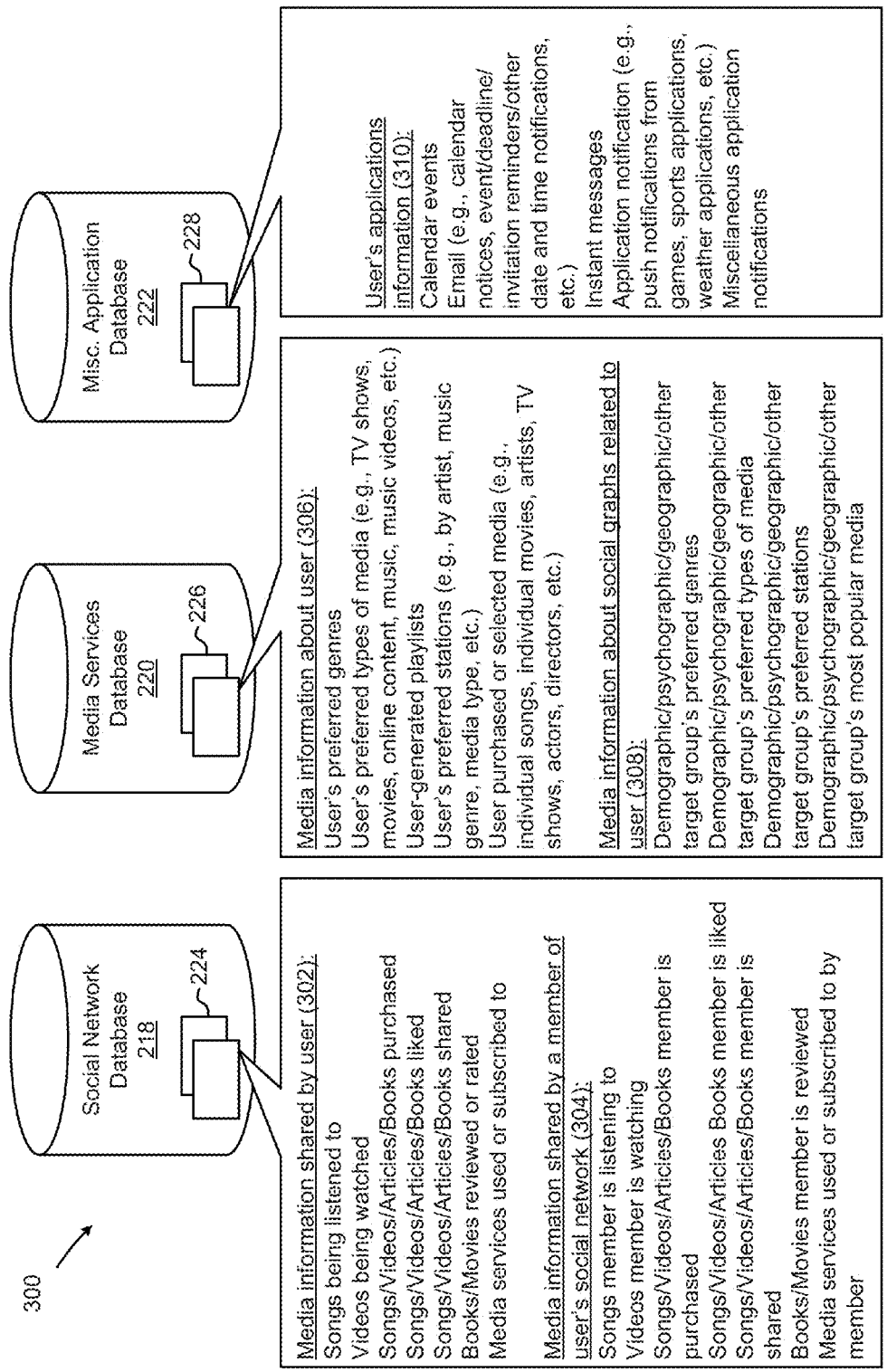
FIG. 3 illustrates a diagram depicting an exemplary set of remote databases storing remote data associated with a user and a user's social graphs.

FIG. 3 illustrates a diagram depicting an exemplary set of remote databases storing remote data associated with a user and a user's social graphs. Here, diagram 300 includes social network database 218, media services database 220, miscellaneous application database 222, social network data 224, media services data 226 and application data 228. Like-numbered and named elements may describe the same or substantially similar elements as those shown in other descriptions. In some examples, social network data 224 may include media information shared by a user (302), for example, using a social networking service (e.g., using an application, website, and the like) with members of said user's social network. Examples of a user may include users 101 and 121 in FIG. 1, user 201 in FIG. 2, or the like. In some examples, media information shared by a user (302) may include, without limitation, media (e.g., songs, playlists, audio books, or the like) being listened to by said user, media (e.g., videos, movies, or the like) being watched by said user, media (e.g., songs, videos, articles, books, or the like) purchased by said user, media (e.g., songs, videos, articles, books, or the like) liked, or otherwise preferred, by said user, media (e.g., songs, videos, articles, books, or the like) shared by said user, media (e.g., videos, articles, books, movies, or the like) reviewed or rated by said user, media services used, or subscribed to, by said user, and the like. In some examples, social network data 224 also may include media information shared by a member of a user's social network (304), for example using, said social networking service. In some examples, media information shared by a member of a user's social network (304) may include, without limitation, media (e.g., songs, playlists, audio books, or the like) being listened to by said member, media (e.g., videos, movies, or the like) being watched by said member, media (e.g., songs, videos, articles, books, or the like) purchased by said member, media (e.g., songs, videos, articles, books, or the like) liked, or otherwise preferred, by said member, media (e.g., songs, videos, articles, books, or the like) shared by said member, media (e.g., videos, articles, books, movies, or the like) reviewed or rated by said member, media services used, or subscribed to, by said member, and the like. In some examples, social network data 224 may include media information shared by more than one member of a user's social network, and may associate a set of media information with each member, or with groups of members, for example, identified by a user or by a social networking service based on stated relationships between a user and other members of the social networking service (e.g., user's immediate family, user's extended family, user's college friends, user's coworkers, user's acquaintances, user's professional connections, user's sports team, user's hobby team, user's followers, members followed by user, or the like). In some examples, social network data 224 also may associate a weight, priority, or importance with a member, or group of members, in a user's social network. In other examples, social network data 224 may include other information, and is not limited to the examples provided.

In some examples, media services data 226 may include media information about a user (306), for example, information associated with a user's consumption of media content using a media service. In some examples, media information about a user (306) may include, without limitation, a user's preferred type(s) of media (e.g., television shows, movies, online content, music, music videos, audio books, or the like), a user's preferred genre(s) (e.g., drama, comedy, romantic comedy, horror, dance music, classical music, classic rock, alternative, jazz, or the like), a user's playlist(s), a user's preferred station(s) (e.g., by artist, music genre, movie genre, media type, or the like), a user's purchased or selected media (e.g., a song, a movie, media by an artist, a television show, an episode, media by an actor, media by a director, or the like). In some examples, media services data 226 also may include media information about social graphs related to a user (308). Such social graphs may include a demographic to which a user belongs, a psychographic profile associated with a user, a geographic area associated with a user, or other target group to which a user may be associated. In some examples, media information about social graphs related to a user (308) may include, without limitation, a preferred genre associated with (e.g., purchased by, shared by, consumed by, liked by, preferred by, or otherwise noted or chosen by) a demographic, psychographic, geographic, group, or other target group, a preferred type of media associated with a demographic, psychographic, geographic, group, or other target group, a preferred station associated with a demographic, psychographic, geographic, group, or other target group, popular media content associated with a demographic, psychographic, geographic, group, or other target group. In other examples, media services data 226 may include other information, and is not limited to the examples provided.

In some examples, application data 228 may include a user's applications information (310). In some examples a user's applications information (310) may include data related to, without limitation, calendar events, emails (e.g., calendar email notices, event reminders, deadline reminders, invitation reminders, other date and time notifications, for example, as may be received from various third party applications, and the like), instant messages, application notifications (e.g., push notifications from games, sports applications, weather applications, financial services applications, media services applications, video conferencing applications, other communications applications, and the like), or other miscellaneous application notifications. In other examples, application data 228 may include other information, and is not limited to the examples provided. In some examples, an application may be operated by a third party entity, which may store such application data 228 remotely (as shown in FIG. 2). In other examples, the quantity, type, function, structure, and configuration of the elements shown may be varied and are not limited to the examples provided.

Figure 4:
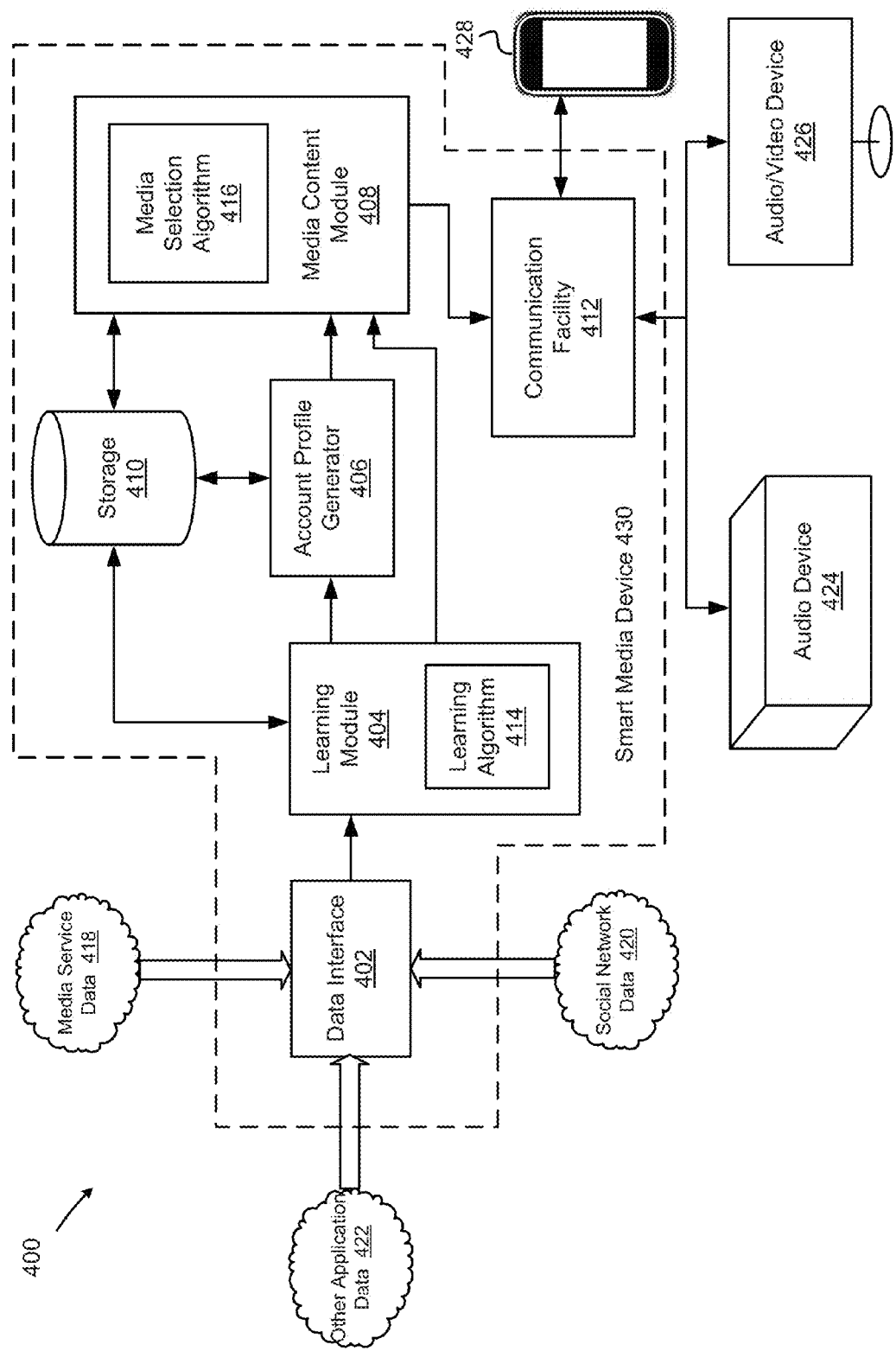
FIG. 4 illustrates an exemplary system of components in a smart media device ecosystem.

FIG. 4 illustrates an exemplary system of components in a smart media device ecosystem. Here, system 400 includes smart media device 430, which may include data interface 402, learning module 404, account profile generator 406, media content module 408, storage 410 and communication facility 412. In other examples, storage 410 may be implemented separately (not shown), and may be in data communication with smart media device 430, through either a wired or wireless connection. In some examples, storage 410 may store data relevant to various modules in smart media device 430, including learning module 404, account profile generator 406 and media content module 408. In some examples, data interface 402 may be configured to receive and send data associated with functions provided by various modules in smart media device 430. In some examples, data interface 402 may be configured to retrieve, receive and provide to other components in system 400 various types of remote data from remote databases, including media service data 418 (e.g., from media services database 220 in FIGS. 2-3, or the like), social network data 420 (e.g., from social network database 218 in FIGS. 2-3, or the like), and other application data 422 (e.g., from miscellaneous application database 222 in FIGS. 2-3, or the like).

In some examples, learning module 404 may be configured to implement learning algorithm 414, which may be configured to learn media tastes and preferences of a user or group of users using local data and remote social graph data (e.g., media service data 418, social network data 420, other application data 422, and the like), and to generate learned media preference data from said local and remote data. In some examples, learning algorithm 414 may use local environmental and behavioral data (i.e., sensor data), stored profile data, including media preference data, and remote social graph data, to generate updated profile data, including updated media preference data pertaining to learned media tastes and preferences, both general (e.g., genres, types, styles, media services, social networks, and the like) and specific (e.g., identified playlists, songs, movies, videos, articles, books, advertisements and other media content, as well as environments associated highly, positively, or otherwise, with said identified media content).

In some examples, account profile generator 406 may be configured to create accounts and account profiles to identify individual users or user groups and to associate the users and user groups with media preference data (e.g., learned tastes and preferences, favored or frequented environments, correlations between media content consumption and an environment, or the like). In some examples, an account may be associated with an individual user. In other examples, an account may be associated with a user group, including, without limitation, a family, a household, a household member's social network, or other social graphs. In some examples, account data (e.g., user identification data, device identification data, metadata, and the like) and media preference data may be stored in one or more profiles associated with an account (e.g., using storage 410 or the like).

In some examples, media content module 408 may be configured to select targeted media content using data from various sources, including account profiles, other stored data, sensor data, remote social graph data, other remote data, and the like. In some examples, media content module 408 may implement media selection algorithm 416 to select targeted media content based on media preference data, for example, stored in storage 410 in association with a profile generated and updated by account profile generator 406. In some examples, media selection algorithm 416 may select targeted media content to play, display, or otherwise provide, to a user, from media content stored both locally and remotely. In some examples, media content module 408 may be configured to generate control signal data to cause a media device (e.g., audio device 424, audio/video device 426, mobile device 428, or the like) to play, display, or otherwise provide targeted media content. Said control signal data may be sent to said media device using communication facility 412. In some examples, communication facility 412 may be configured to exchange data between one or more components of smart media device 430, and other devices implemented separately from smart media device 430, using wired or wireless connections, and using short range communication protocols and/or long range communication protocols. As used herein, "facility" refers to any, some, or all of the features and structures that are used to implement a given set of functions. In some examples, audio device 424 may be configured to output audio. In some examples, audio/video device 426 may be configured to output audio and video. In some examples, mobile device 428 may be implemented with various audio and visual/video output capabilities (e.g., speakers, video display, graphic display, and the like), and may be configured to operate various types of applications associated with media, social networking, phone calls, video conferencing, calendars, games, data communications, and the like. In other examples, the quantity, type, function, structure, and configuration of the elements shown may be varied and are not limited to the examples provided.

Figure 5A:
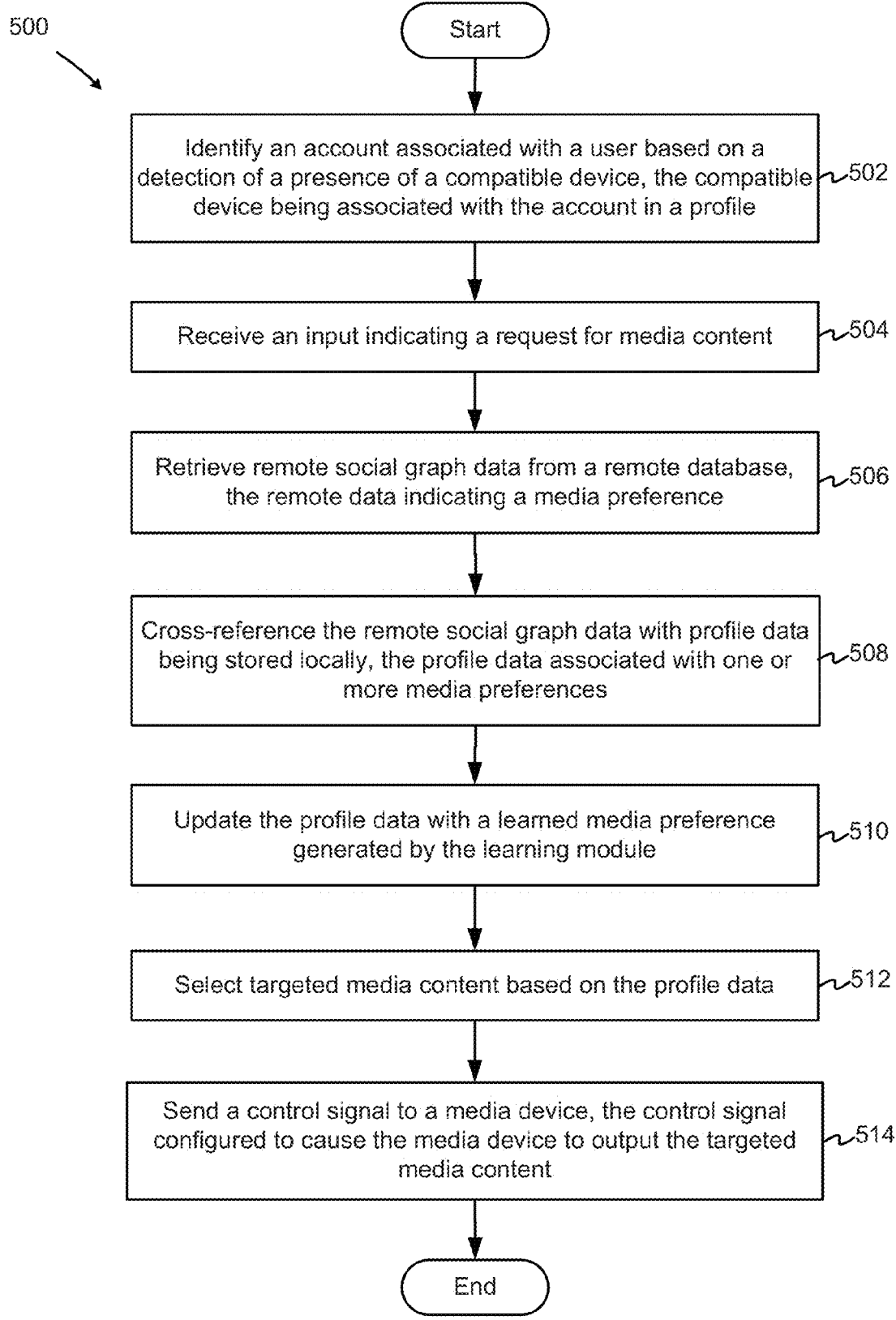
FIG. 5A illustrates an exemplary flow for selecting and outputting targeted media content.

FIG. 5A illustrates an exemplary flow for selecting and outputting targeted media content. Here, flow 500 begins with identifying an account associated with a user based on a detection of a presence of a compatible device, the compatible device being associated with the account in a profile (502). Once an account is identified, an input may be received indicating a request for media content (504). In some examples, the input may be received using one or more buttons implemented on a smart media device, or using an application or user interface implemented on a mobile device, as described herein. Once a request is received (i.e., by the input), remote social graph data from a remote database may be retrieved, the remote social graph data indicating a media preference (506). Then, the remote social graph data may be cross-referenced with profile data being stored locally, the profile data associated with one or more media preferences (508). In some examples, said cross-referencing may be performed by a learning module implemented in a smart media device. The profile data may then be updated with a learned media preference generated by the learning module (510), for example, through said cross-referencing of remote social graph data with local data. In some examples, said profile data may be updated by a profile generator implemented in the smart media device. Then, targeted media content may be selected based on the profile data (512), for example, as updated by the profile generated with the learned media preference. In some examples, said selection may be performed by a media content module implemented in the smart media device. In some examples, a smart media device may then send a control signal to a media device, the control signal configured to cause the media device to output the targeted media content (514). In some examples, the media device may be implemented in or by said smart media device. In other examples, the media device may be implemented separately (e.g., by a separate audio/video device, mobile device, or the like, as described herein). In still other examples, the above-described process may be varied in steps, order, function, processes, or other aspects, and is not limited to those shown and described.

Figure 5B:
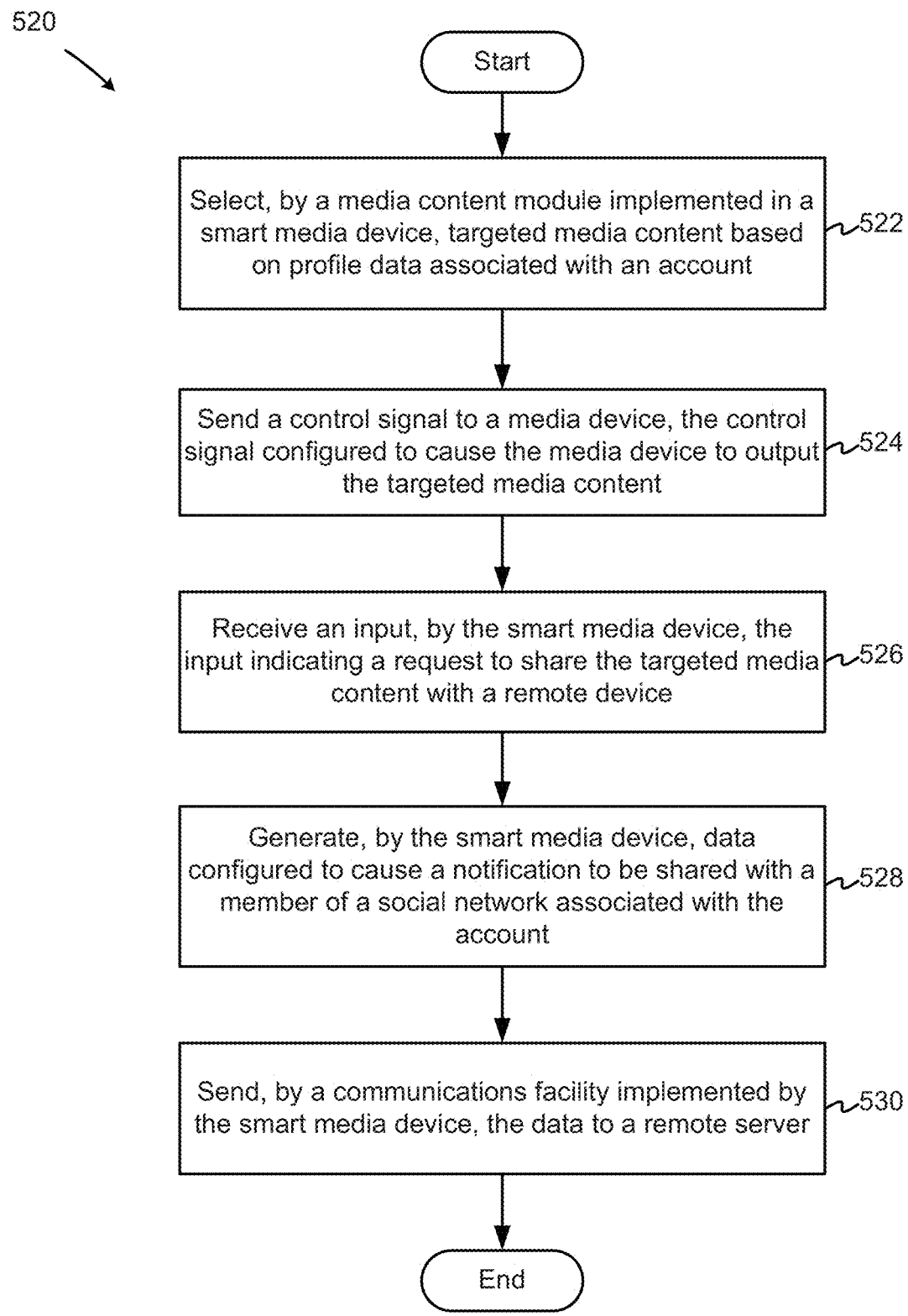
FIG. 5B illustrates an exemplary flow for sharing targeted media content with a remote device.

FIG. 5B illustrates an exemplary flow for sharing targeted media content with a remote device. Here, flow 520 may begin with selecting targeted media content based on profile data associated with an account (522). In some examples, said selection of targeted media content may be performed by a media content module implemented in a smart media device. Once a targeted media content is selected, a control signal may be sent to a media device, the control signal configured to cause the media device to output the targeted media content (524). An input may be received by the smart media device, the input indicating a request to share the targeted media content with a remote device (526). The smart media device then may generate data configured to cause a notification to be shared with a member of a social network associated with the account (528). The smart media device also may send, by a communications facility implemented by the smart media device, the data to a remote server (530). In some examples, said remote server may include a database configured to store social network data, media services data and/or application data, as described herein. In still other examples, the above-described process may be varied in steps, order, function, processes, or other aspects, and is not limited to those shown and described.

Figure 6:
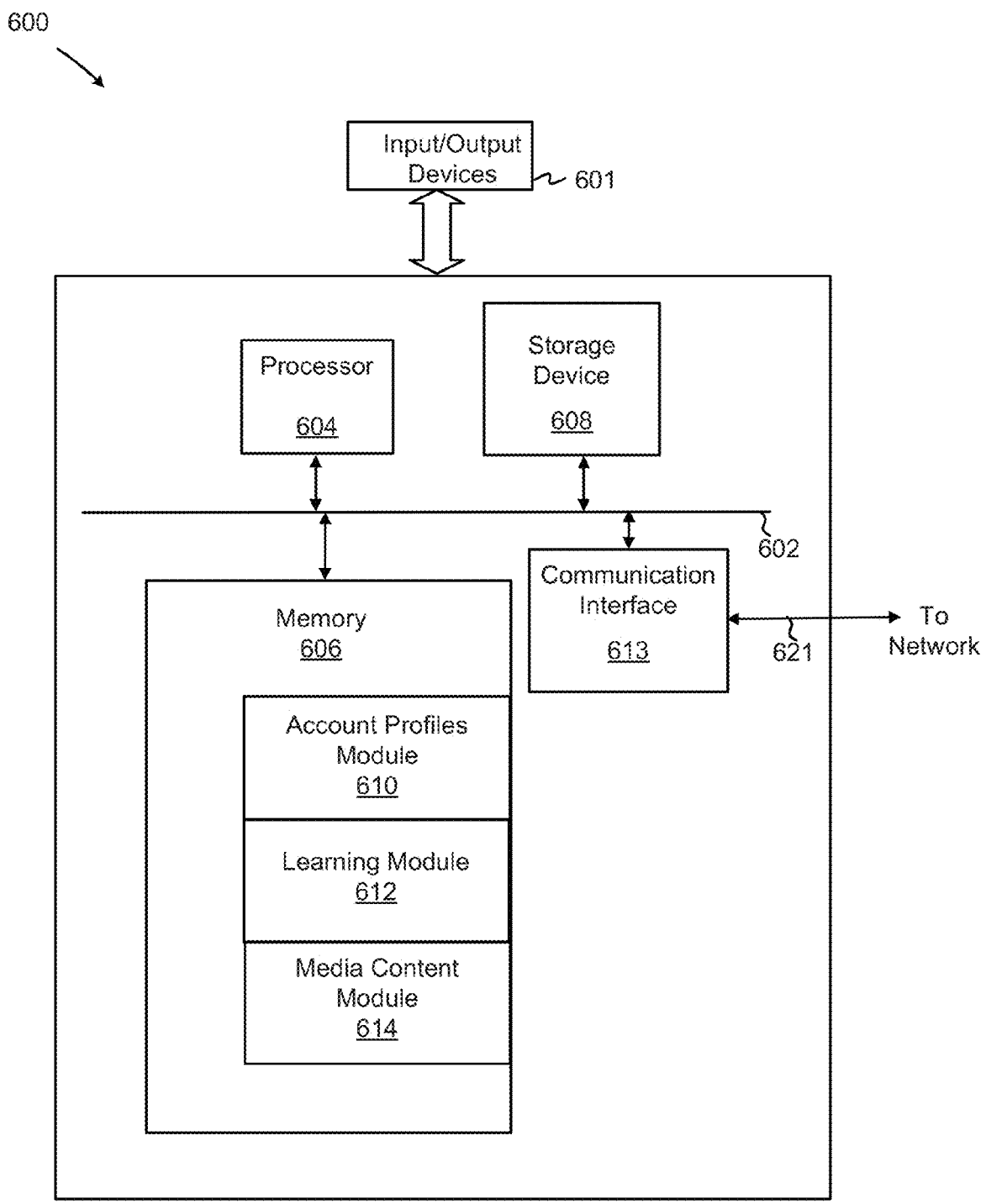
FIG. 6 illustrates an exemplary system and platform for implementing a smart media device ecosystem using local and remote data sources.

FIG. 6 illustrates an exemplary system and platform for implementing a smart media device ecosystem using local and remote data sources. In some examples, computing platform 600 may be used to implement computer programs, applications, methods, processes, algorithms, or other software to perform the above-described techniques. Computing platform 600 includes a bus 602 or other communication mechanism for communicating information, which interconnects subsystems and devices, such as processor 604, system memory 606 (e.g., RAM, etc.), storage device 608 (e.g., ROM, etc.), a communication interface 613 (e.g., an Ethernet or wireless controller, a Bluetooth controller, etc.) to facilitate communications via a port on communication link 621 to communicate, for example, with a computing device, including mobile computing and/or communication devices with processors. Processor 604 can be implemented with one or more central processing units ("CPUs"), such as those manufactured by Intel® Corporation, or one or more virtual processors, as well as any combination of CPUs and virtual processors. Computing platform 600 exchanges data representing inputs and outputs via input-and-output devices 601, including, but not limited to, keyboards, mice, audio inputs (e.g., speech-to-text devices), user interfaces, LCD or LED or other displays, monitors, cursors, touch-sensitive displays, speakers, media players and other I/O-related devices.

According to some examples, computing platform 600 performs specific operations by processor 604 executing one or more sequences of one or more instructions stored in system memory 606, and computing platform 600 can be implemented in a client-server arrangement, peer-to-peer arrangement, or as any mobile computing device, including smart phones and the like. Such instructions or data may be read into system memory 606 from another computer readable medium, such as storage device 608. In some examples, hard-wired circuitry may be used in place of or in combination with software instructions for implementation. Instructions may be embedded in software or firmware. The term "computer readable medium" refers to any non-transitory medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by computing platform 600. According to some examples, computing platform 600 can be coupled by communication link 621 (e.g., a wired network, such as LAN, PSTN, or any wireless network) to any other processor to perform the sequence of instructions in coordination with (or asynchronous to) one another. Computing platform 600 may transmit and receive messages, data, and instructions, including program code (e.g., application code) through communication link 621 and communication interface 613. Received program code may be executed by processor 604 as it is received, and/or stored in memory 606 or other non-volatile storage for later execution.

In the example shown, system memory 606 can include various modules that include executable instructions to implement functionalities described herein. In the example shown, system memory 606 includes account profiles module 610 configured to create and modify (i.e., update) profiles, as described herein. System memory 606 also may include learning module 612, which may be configured to learn media tastes and preferences of one or more users, as described herein. System memory 606 also may include media content module 614, which may be configured to select targeted media content, as described herein.

In some embodiments, various devices described herein may communicate (e.g., wired or wirelessly) with each other, or with other compatible devices, using computing platform 600. As depicted in FIGS. 1-4 herein, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIGS. 1-4 can represent one or more algorithms. Or, at least one of the elements can represent a portion of logic including a portion of hardware configured to provide constituent structures and/or functionalities.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, smart media devices 104, 124, 208 and 430, including one or more components, can be implemented in one or more computing devices that include one or more circuits. Thus, at least one of the elements in FIGS. 1-4 can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention. Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
   selecting, by a media content module implemented in a smart media device, targeted media content based on profile data associated with an account;
   sending a control signal to a media device, the control signal configured to cause the media device to provide the targeted media content;
   receiving an input, by the smart media device, the input indicating a request to share the targeted media content with a remote device;
   generating, by the smart media device, data configured to cause a notification to be shared with a member of a social network associated with the account; and
   sending, by a communications facility implemented by the smart media device, the data to a remote server associated with the social network,
   wherein the smart media device is configured to receive remote social graph associated with another notification being shared by a member of the social network, the notification associated with another targeted media content, the remote social graph configured to cause the smart media device to output the another targeted media content.

2. The method of claim 1, wherein receiving the input comprises receiving data from an application installed on the compatible device.

3. The method of claim 1, wherein receiving the input comprises detecting a button selection, the button selection invoking preprogrammed data indicating the request for media content.

4. The method of claim 1, wherein receiving the input comprises receiving sensor data associated with an audio command.

5. The method of claim 1, wherein receiving the input comprises receiving sensor data associated with a motion command.

6. The method of claim 1, wherein the targeted media content comprises audio content and the control signal is configured to cause the media device to output the audio content.

7. The method of claim 1, wherein the targeted media content comprises video content and the control signal is configured to cause the media device to output the video content.

8. The method of claim 1, wherein the targeted media content comprises graphic content and the control signal is configured to cause the media device to display the graphic content.

9. The method of claim 1, wherein the targeted media content comprises textual content and the control signal is configured to cause the media device to display the textual content.

10. The method of claim 1, wherein the notification comprises a publication on a social network website.

11. The method of claim 1, wherein the notification comprises a message pushed to a mobile device.

12. The method of claim 1, wherein the notification comprises a message pushed to a wearable device.

13. The method of claim 1, wherein the notification comprises a message pushed to another smart media device.

14. The method of claim 1, wherein the notification comprises a vibration.

15. The method of claim 1, further comprising:
identifying another smart media device as being associated with a member of a user's social network; and
sending a control signal to the another smart media device using a remote server, the control signal configured to cause the another smart media device to output the targeted media content.

* * * * *